United States Patent Office.

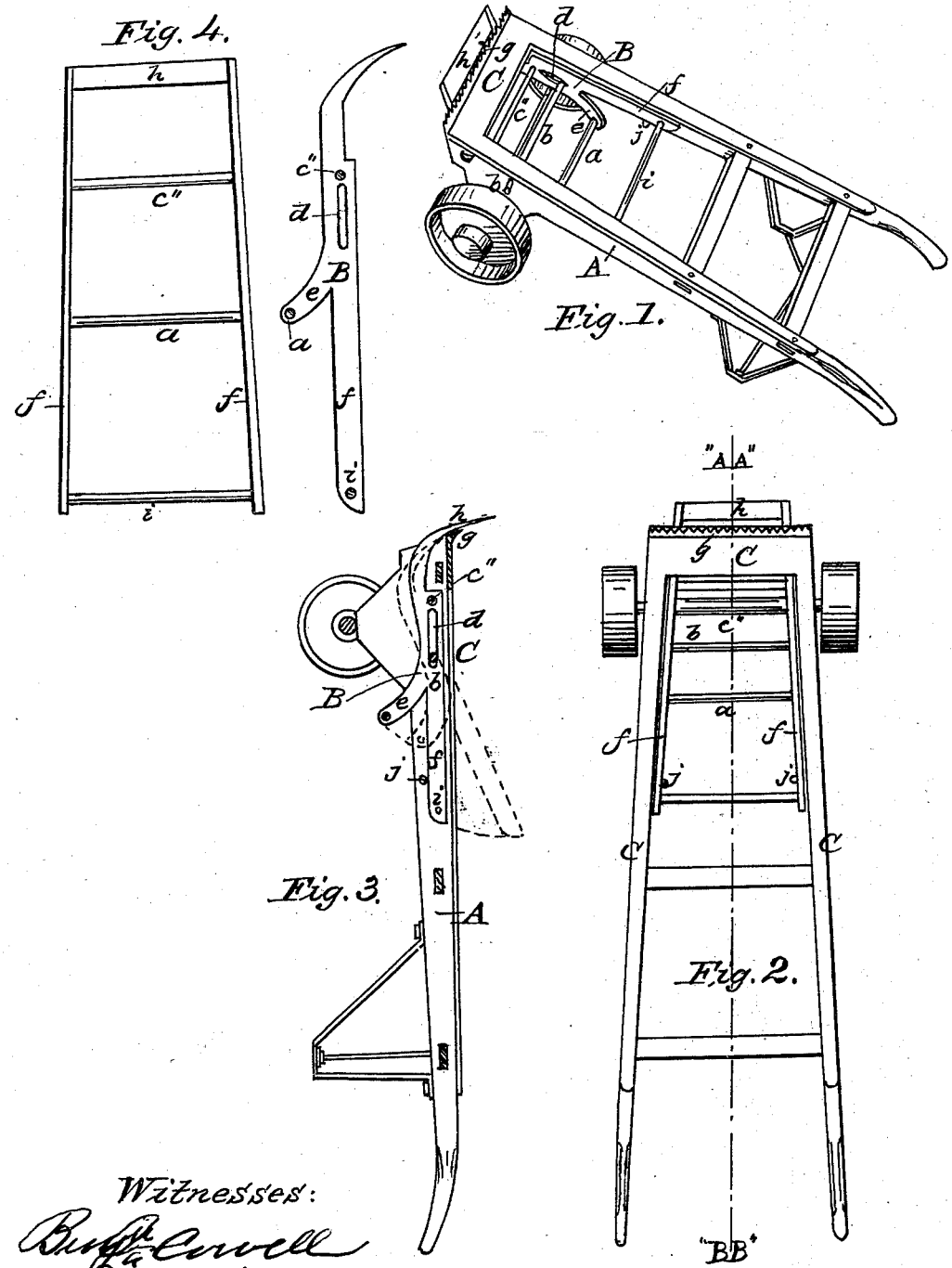

THOMAS A. SLACK, OF PEORIA, ILLINOIS, ASSIGNOR TO HIMSELF AND CHAUNCEY NYE, OF THE SAME PLACE.

Letters Patent No. 71,800, dated December 3, 1867.

IMPROVEMENT IN HAND-TRUCK.

The Schedule referred to in these Letters Patent and making part of the same.

Be it known that I, THOMAS A. SLACK, of the city of Peoria, in the county of Peoria, and State of Illinois, have invented a new and useful Improvement on a Hand-Truck; and I do hereby declare that the following is a full, clear, and exact description of the construction and operation of the same, reference being had to the annexed drawings, in which—

Figure 1 is a perspective view,
Figure 2 is a plan,
Figure 3 is a longitudinal section,
Figure 4 is an adjusting-shovel, and
Figure 5 is a side elevation of adjusting-shovel.

My invention consists in the application of an adjusting-shovel to the common hand-truck in such a manner as to facilitate the loading and discharging of freight in the use of the truck.

I make a hand-truck of the usual form, putting the wheels outside of the body of the truck, and leaving out cross-bars, so as to admit the adjusting-shovel, making the improved truck complete, as it appears in fig. 1. I make teeth $g$, fig. 1, on the forward end of the body of the truck, bevelling off the upper edge of the sides of the teeth. I make an adjusting-shovel, represented by figs. 4 and 5, of which B, fig. 5, is a side piece of the frame of the shovel; $h$, the blade of the shovel; $c$ and $i$, cross-bars; $d$, a slot in the side piece of the shovel; $e$, a projection of the side piece of the shovel, and $a$, a foot-guide to the shovel. I suspend the shovel in the truck upon the axle or pivot-bar $b$, and support the same by the rests $j\,j$, placed in the side pieces of the truck, as represented in fig. 1.

In using the improved truck, I raise the handles so that the blade of the shovel nearly touches the ground, and run the truck against the box or bale to be loaded upon it. As the truck strikes the box, the blade of the shovel is thrown back, and the shovel is placed in the position, relative to the body of the truck, indicated by the dotted lines in fig. 3. The teeth readily catch under the side of the box or bale, and I raise the same by bearing down upon the handles of the truck. The blade of the shovel immediately passes under the box or bale, or is thrown under by the application of the foot to the foot-guide $a$. I then pull the box over upon the truck, and the weight of the same, as it rests upon the frame of the shovel, holds the shovel in the position represented in fig. 1, thereby keeping the box or bale upon the truck. In discharging freight, I raise the handles of the truck high enough to cause the box to roll off at the forward end of the truck, and as the same falls, the blade of the shovel is thrown back, and as the box strikes the ground it becomes entirely disengaged from the truck.

What I claim as my invention, and desire to secure by Letters Patent, is—

1. The teeth or projections upon the forward end of the body of the truck.
2. The adjusting-shovel, provided with the blade $h$, the side piece B, the slot $d$, the projection $e$, the foot-guide $a$, and the cross-bars $c$ and $i$.
3. The axle or pivot-bar $b$; when all shall be constructed, combined, arranged, and operated as and for the purpose set forth and described.

THOMAS A. SLACK.

Witnesses:
BENJA. CAVELL,
EDMUND THURLOW.